(12) United States Patent
Lee

(10) Patent No.: US 6,802,063 B1
(45) Date of Patent: Oct. 5, 2004

(54) 64-BIT OPEN FIRMWARE IMPLEMENTATION AND ASSOCIATED API

(75) Inventor: Van Hoa Lee, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 869 days.

(21) Appl. No.: 09/616,144

(22) Filed: Jul. 13, 2000

(51) Int. Cl.[7] ............................................. G06F 9/00
(52) U.S. Cl. ..................... 718/1; 718/100; 718/102; 712/1; 712/13
(58) Field of Search ..................... 718/1, 100, 101, 718/102, 103, 104, 105, 106, 108; 709/215, 229; 712/1, 13

(56) References Cited

U.S. PATENT DOCUMENTS

| | | | |
|---|---|---|---|
| 5,319,760 A | * | 6/1994 | Mason et al. ............... 711/208 |
| 5,968,136 A | * | 10/1999 | Saulpaugh et al. ............ 710/3 |
| 6,393,495 B1 | * | 5/2002 | Flory et al. ................. 719/327 |
| 6,538,669 B1 | * | 3/2003 | Lagueux et al. ............. 345/764 |
| 6,542,926 B2 | * | 4/2003 | Zalewski et al. ............ 709/213 |
| 6,633,916 B2 | * | 10/2003 | Kauffman ................... 709/229 |

* cited by examiner

*Primary Examiner*—Majid A. Banankhan
(74) *Attorney, Agent, or Firm*—Duke W. Yee; Mark E. McBurney; Lisa L. B. Yociss

(57) ABSTRACT

An improved logically partitioned data processing system is provided. In one embodiment, the data processing system includes a plurality of hardware devices, including processors, and a plurality of operating systems. Each of the plurality of operating systems executes within a separate partition within the logically partitioned data processing system. A firmware component provides each operating system with a virtualized copy of the hardware devices, thus maintaining separation between each of the logical partitions. The firmware component is implemented as 64-bits, thus allowing each of the processors to execute in 64-bit mode and eliminating the need for virtual address translation from a 32-bit virtual address to a 64-bit physical address.

26 Claims, 3 Drawing Sheets

100 DATA PROCESSING SYSTEM

200
LOGICALLY PARTITIONED PLATFORM

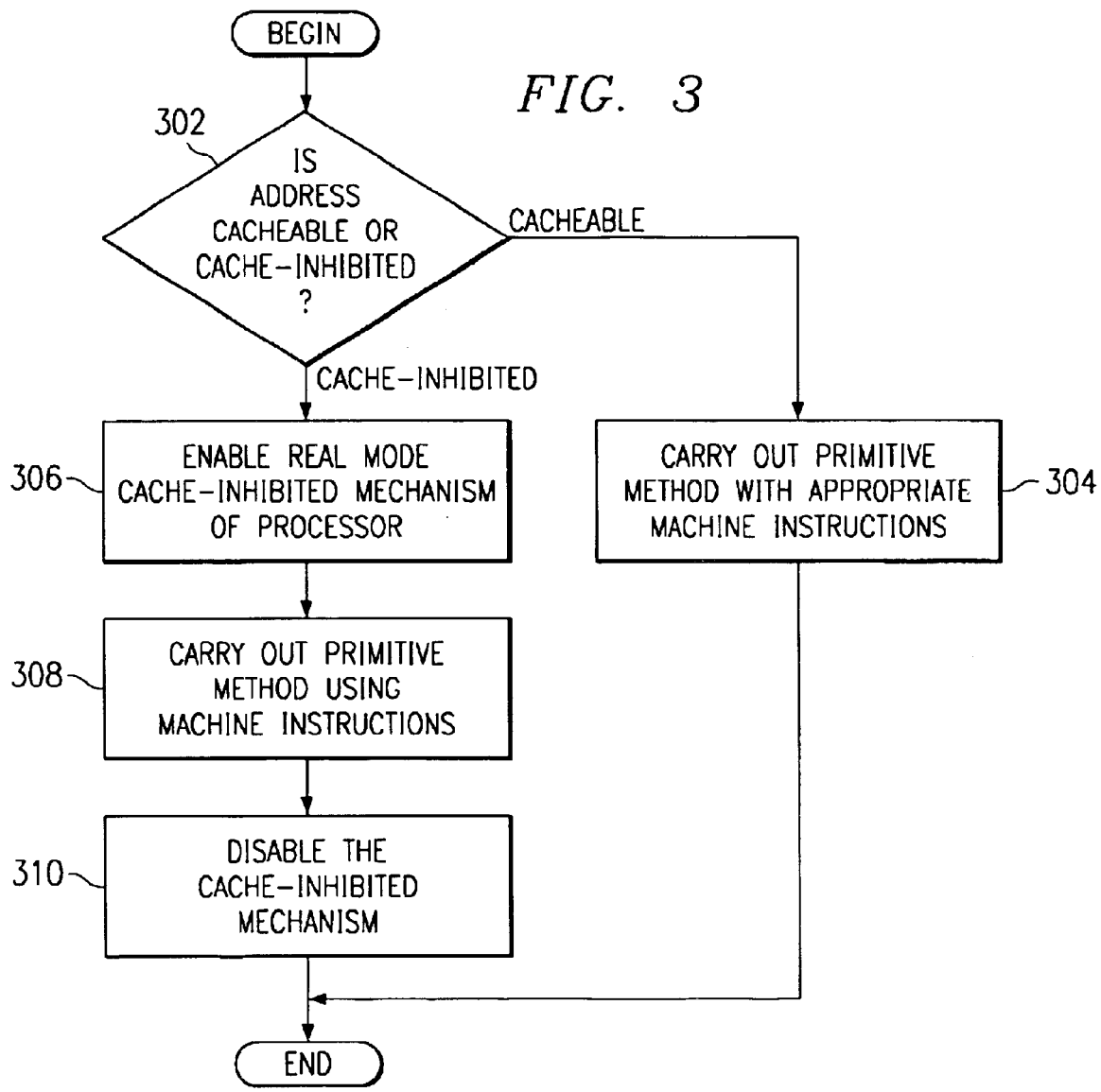

64-BIT OPEN FIRMWARE IMPLEMENTATION AND ASSOCIATED API

BACKGROUND OF THE INVENTION

1. Technical Field

The present invention relates an improved data processing system and, more particularly, to a method, system, and apparatus for providing a 64-bit open firmware support for a logically partitioned data processing system.

2. Description of Related Art

A logical partitioning option (LPAR) within a data processing system (platform) allows multiple copies of a single operating system (OS) or multiple heterogeneous operating systems to be simultaneously run on a single data processing system platform. A partition, within which an operating system image runs, is assigned a non-overlapping sub-set of the platform's resources. These platform allocable resources include one or more architecturally distinct processors with their interrupt management area, regions of system memory, and input/output (I/O) adapter bus slots. The partition's resources are represented by its own open firmware device tree to the OS image.

Each distinct OS or image of an OS running within the platform is protected from each other such that software errors on one logical partition can not affect the correct operation of any of the other partitions. This is provided by allocating a disjoint set of platform resources to be directly managed by each OS image and by providing mechanisms for ensuring that the various images can not control any resources that have not been allocated to it. Furthermore, software errors in the control of an OS's allocated resources are prevented from affecting the resources of any other image. Thus, each image of the OS (or each different OS) directly controls a distinct set of allocable resources within the platform.

Recently, LPAR systems have begun to utilize 64-bit processors and resources. However, currently, to support LPAR for data processing systems, such as the RS/6000 server machine a product of the International Business Machines Corporation of Armonk, N.Y., a 32-bit open firmware implementation has continued to be utilized. This current 32-bit open firmware implementation used in conjunction with 64-bit data processing systems has many limitations. For example, the current open firmware utilizes 32-bit virtual addresses translated to 64-bit physical addresses, thus requiring the direct usage of the virtual address translation hardware, which is also shared with other components within the data processing system. This presents a significant problem and effort to support LPAR with the existing 32-bit open firmware. Therefore, it would be desirable to have a 64-bit implementation of the open firmware used to support LPAR in 64-bit data processing systems.

SUMMARY OF THE INVENTION

The present invention provides an improved logically partitioned data processing system. In one embodiment, the data processing system includes a plurality of hardware devices, including processors, and a plurality of operating systems. Each of the plurality of operating systems executes within a separate partition within the logically partitioned data processing system. A firmware component provides each operating system with a virtualized copy of the hardware devices, thus maintaining separation between each of the logical partitions. The firmware component is implemented as 64-bits, thus allowing each of the processors to execute in 64-bit mode and eliminating the need for virtual address translation from a 32-bit virtual address to a 64-bit physical address.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 depicts a flowchart illustrating an exemplary method for Primitive Methods to check that a given address is cacheable or cache-inhibited in accordance with the present invention.

DETAILED DESCRIPTION OF THE PREFERRED EMBODIMENT

Figure 1:
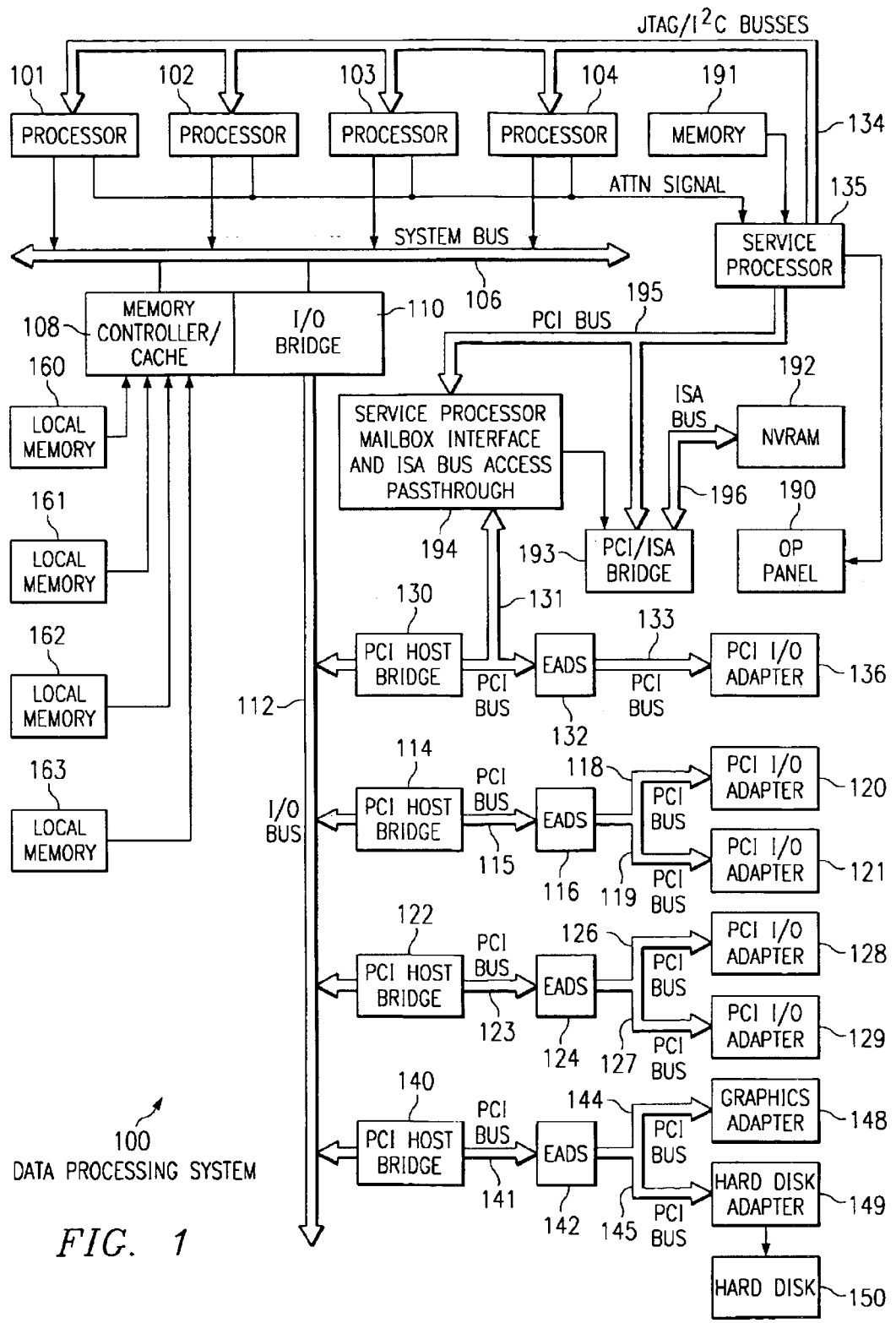
FIG. 1 depicts a block diagram of a data processing system in which the present invention may be implemented.

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 106. For example, data processing system 100 may be an IBM RS/6000, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160–163. I/O bus bridge 110 is connected to system bus 106 and provides an interface to I/O bus 112. Memory controller/cache 108 and I/O bus bridge 110 may be integrated as depicted.

Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different I/O adapters 120–121, 128–129, 136, and 148–149 may be assigned to different logical partitions.

Thus, for example, suppose data processing system 100 is divided into three logical partitions, P1, P2, and P3. Each of I/O adapters 120–121, 128–129, 136, and 148–149 each of processors 101–104, and each of local memories 160–164 is assigned to one of the three partitions. For example, processor 101, memory 160, and I/O adapters 120, 128, and 129 may be assigned to logical partition P1; processors 102–103, memory 161, and I/O adapters 121 and 136 may be assigned to partition P2; and processor 104, memories 162–163, and I/O adapters 148–149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Windows 2000 operating system may be operating within logical partition P1. Windows 2000 is a product and trademark of Microsoft Corporation of Redmond, Wash.

Peripheral component interconnect (PCI) Host bridge 114 connected to I/O bus 112 provides an interface to PCI local bus 115. A number of Input/Output adapters 120–121 may be connected to PCI bus 115. Typical PCI bus implementations will support between four and eight I/O adapters (i.e. expansion slots for add-in connectors). Each I/O Adapter 120–121 provides an interface between data processing system 100 and input/output devices such as, for example, other network computers, which are clients to data processing system 100.

An additional PCI host bridge 122 provide an interface for an additional PCI bus 123. PCI bus 123 is connected to a plurality of PCI I/O adapters 128–129 by a PCI bus 126–127. Thus, additional I/O devices, such as, for example, modems or network adapters may be supported through each of PCI I/O adapters 128–129. In this manner, data processing system 100 allows connections to multiple network computers.

A memory mapped graphics adapter 148 may be connected to I/O bus 112 through PCI Host Bridge 140 and EADS 142 via PCI buses 141 and 144 as depicted. Also, a hard disk 150 may also be connected to I/O bus 112 through PCI Host Bridge 140 and EADS 142 via PCI buses 141 and 145 as depicted. Hard disk 150 may be logically partitioned between various partitions without the need for additional hard disks. However, additional hard disks may be utilized if desired.

A PCI host bridge 130 provides an interface for a PCI bus 131 to connect to I/O bus 112. PCI bus 131 connects PCI host bridge 130 to the service processor mailbox interface and ISA bus access passthrough logic 194 and EADS 132. The ISA bus access passthrough logic 194 forwards PCI accesses destined to the PCI/ISA bridge 193. The NV-RAM storage is connected to the ISA bus 196. The Service processor 135 is coupled to the service processor mailbox interface 194 through its local PCI bus 195. Service processors 135 is also connected to processors 101–104 via a plurality of JTAG/I²C buses 134. JTAG/I²C buses 134 are a combination of JTAG/scan busses (see IEEE 1149.1) and Phillips I²C busses. However, alternatively, JTAG/I²C buses 134 may be replaced by only Phillips I²C busses or only JTAG/scan busses. All SP-ATTN signals of the host processors 101, 102, 103, and 104 are connected together to an interrupt input signal of the service processor. The service processor 135 has its own local memory 191, and has access to the hardware op-panel 190.

When data processing system 100 is initially powered up, service processor 135 uses the JTAG/scan buses 134 to interrogate the system (Host) processors 101–104, memory controller 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the system processors 101–104, memory controller 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (Host) memories 160–163. Service processor 135 then releases the Host processors 101–104 for execution of the code loaded into Host memory 160–163. While the Host processors 101–104 are executing code from respective operating systems within the data processing system 100, service processor 135 enters a mode of monitoring and reporting errors. The type of items monitored by service processor include, for example, the cooling fan speed and operation, thermal sensors, power supply regulators, and recoverable and non-recoverable errors reported by processors 101–104, memories 160–163, and bus-bridge controller 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
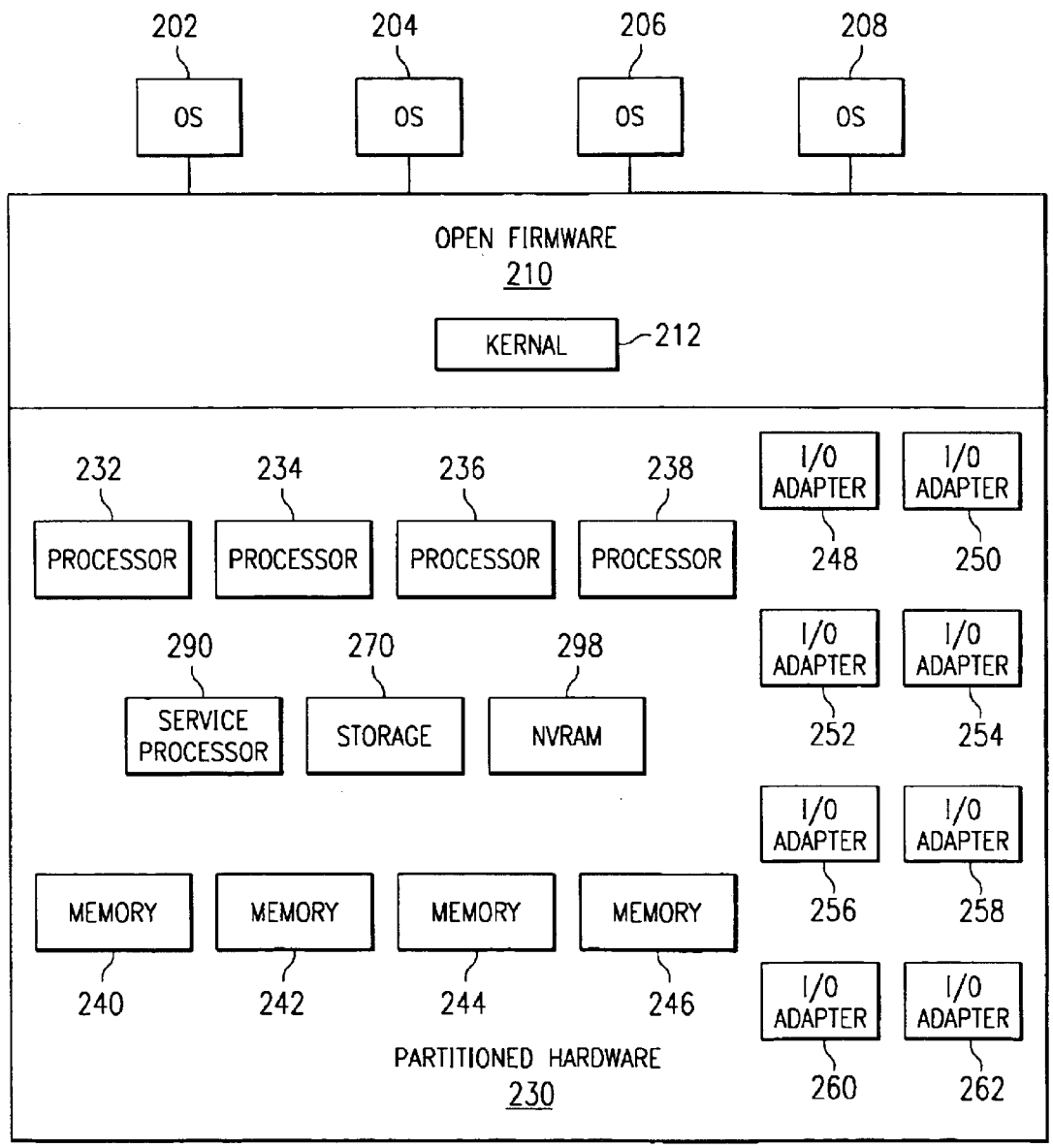
FIG. 2 depicts a block diagram of an exemplary logically partitioned platform in which the present invention may be implemented.

With reference now to FIG. 2, a block diagram of an exemplary logically partitioned platform is depicted in which the present invention may be implemented. The hardware in logically partitioned platform 200 may be implemented as, for example, server 100 in FIG. 1. Logically partitioned platform 200 includes partitioned hardware 230, Open Firmware (OF) 210, and operating systems 202–208. Operating systems 202–208 may be multiple copies of a single operating system or multiple heterogeneous operating systems simultaneously run on platform 200.

Partitioned hardware 230 includes a plurality of processors 232–238, a plurality of system memory units 240–246, a plurality of input/output (I/O) adapters 248–262, and a storage unit 270. Each of the processors 242–248, memory units 240–246, NV-RAM storage 298, and I/O adapters 248–262 may be assigned to one of multiple partitions within logically partitioned platform 200, each of which corresponds to one of operating systems 202–208.

OF 210 performs a number of functions and services for operating system images 202–208 to create and enforce the partitioning of logically partitioned platform 200. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM).

OF 210 is a firmware implemented virtual machine identical to the underlying hardware. Thus, OF 210 allows the simultaneous execution of independent OS images 202–208 by virtualizing all the hardware resources of logically partitioned platform 200. OF 210 may attach I/O devices through I/O adapters 248–262 to single virtual machines in an exclusive mode for use by one of OS images 202–208. OF 210 has a 64-bit kernel 212 and runs in 64-bit mode of the PowerPC processors 232–238, which may be implemented, for example, as PowerPC processors. OF 210 optimizes for RS/6000 LPAR support by ONLY supporting big-endian mode and real mode as specified in IEEE 1275. Thus, OF 210 eliminates virtual addresses and paging translations, which are used in the prior art.

Cache-inhibited programmed I/O (PIO) accesses accomplished through paging translation are replaced by a new hardware mechanism to bypass the processor cache. OF 210 maintains a list of cacheable address ranges to check for any PIO access. If a PIO access is detected, the new cache-inhibited mechanism within processors 232–238 is temporarily enabled to carry out the PIO access. A cache-inhibited mode allows an access to bypass the processor's cache. OF 210 provides the benefit of a larger address space for OF 210 to operate and manage, while remaining compatible with codes written for 32-bit OFs. A Cacheable access, as opposed to a cache-inhibited access, means that the result of the access can be brought/stored into the processor's cache, such as the cache of one of processors 232–238, for faster retrieval should it be needed later. System memory accesses are generally cacheable. A cache-inhibited access will not use the processor's cache. PIO accesses, for example, are cache-inhibited.

By implementing OF 210 in 64-bit mode, the processors 232–238 to operate in 64-bit mode and real mode addressing. Hence, OF 210 removes one of the major problems related to using virtual address translation hardware. The 64-bit implementation of OF 210 also provides several other advantages to open firmware developers, such as, for example, the ability to have 64-bit quantities and 64-bit addresses, 64-bit quantity computations and comparisons, and larger available memory space for programs.

OF kernel 212 supports cache-inhibited programmed input/output (PIO) accesses by maintaining a list of (address, size) pairs which describe the cacheable system memory addresses. An address not falling within one of these address ranges is considered a cache-inhibited system address that may be mapped to an I/O address, such as to one of I/O adapters 248–262.

Primitive methods, such as, for example, c@, c!, W@, and W!, are modified to check for the given address as either cacheable or cache-inhibited. Primitive methods are basic read/write methods to either system memory or PIO address space. With reference now to FIG. 3, a flowchart illustrating an exemplary method for Primitive Methods to check that a given address is cacheable or cache-inhibited is depicted in accordance with the present invention. The primitive method first checks to determine whether the given address is cacheable or cache-inhibited (step 302). For cacheable addresses, the methods are carried out with the appropriate machine language instructions (step 304). On the other hand, if the methods access cache-inhibited addresses, the real mode cache-inhibited mechanism of processors 232–238 is first enabled (step 306), then the accesses are carried out by the machine language instructions (step 308), and the cache-inhibited mechanism is again disabled after the accesses (step 310).

Storage allocated with alloc-mem methods such as, for example, storages provided by the "buffer" and "create" methods are always cacheable. Therefore, the methods to accessing theses storages addresses bypass the address checking. The "fill", "fill!", "move" and "comp" methods have incorporate address checking to properly handle both cacheable and cache-inhibited storages.

Returning now to FIG. 2, in one embodiment of OF 210, the "/N" method returns 8 for a 64-bit kernel. Furthermore, the "!" and "@" On methods operate on 64-bit quantities. Addresses should be saved in storage allocated with "/N" so that the source code works on a 32-bit kernel as well as a 64-bit kernel. For adapter Fcode developer with stand-alone 32-bit tokenizer, the "0 NA1+" method is utilized rather than the "/N" method to obtain the correct storage amount. Encode-cell and decode-cell methods are used to encode/decode addresses that are saved as values of a device node property.

Other constraints that should be implemented in order to utilize one embodiment of 64-bit OF 210, include ensuring that constants, values, and variables are all 64-bit quantities. Any 32-bit value is zero-extended into a 64-bit value. In order to have a negative value, a minus sign is used, e.g. h#-100, d#-100. Otherwise, the 64-bit number is specified in hexadecimal form. Primitive arithmetic operations/comparisons and logical operations are performed with 64-bit quantities. Fcode 0x14D is implemented for 64-bit literal. The "<L@" method is also implemented.

As noted above, OF 210 supports all methods specified by the IEEE 1275 standard. Third party Fcode developers can write open firmware codes that will run correctly under both a 32-bit kernel and the 64-bit kernel 212 of the present invention based on the IEEE 1275 standard by observing the following recommended practices:

1. /N: For a 64-bit open firmware (64OF) implementation, set /N to 8. For a 32-bit open firmware implementation (32OF), set /N to 4. Therefore, the developer may determine the open firmware environment by the "64-bit?" method defined as shown below:
   :64-bit? (–true/false)/N/L<>;
2. Stack items: All stack, user stack or return stack items have size of /N.
3. Values, Defers, and Variables: These methods should be allocated to hold /N bytes. The standard loop count variables I and J are also /N bytes.
4. Literals: Under 64OF, a literal is a 64-bit quantity. Since adapter Fcodes are generated as 32OF code, there are only four bytes of literal data immediately after the literal Fcode 0x10. When the adapter Fcodes are evaluated on 64OF, the evaluator will correctly handle this 32OF literal Fcode.
   i. Executing: When the literal Fcode is executed on 64OF, the evaluator reads four bytes of data immediately after Fcode 0x10 and returns an item on the stack with a lower 32-bits having the value of the literal. The literal is only zero-extended.
   ii. Compiling: When the evaluator is generating a colon definition and encounters a literal Fcode 0x10, the evaluator reads the four bytes immediately after the Fcode 0x10, zero-extends the literal value to a 64-bit quantity, and places the value in the dictionary space of the colon method.
5. Constants: 64OF may have 64-bit constants. However, literals are treated as 32-bit quantities during adapter Fcode evaluation. Thus, constants, may only take on 32-bit unsigned values when they are created with literal Fcode 0x10.
6. Sign-extending: Since the sign-bit position of a 32-bit quantity in 32OF is bit-32 of the 64-bit quantity, in 64OF, the following sign-extending methods should be used:

i. 16-bit sign-extended: One of the following two methods may be utilized:
   a. Use the "<W@" method to read a 16-bit quantity and automatically sign-extends in both 32OF and 64OF; or
   b. use the "W@", "RW@", or "XW@" method to read a 16-bit unsigned quantity, then use the following method to sign-extend the quantity:
:16-sign-ext(n–n')d# 16 64-bit? if d# 32+then tuck<<swap>>a;
   ii. 32-bit sign-extended: Use the "L@", "RL@", or "XL@" method to read as 32-bit unsigned quantity. Then use the following method to sign-extend the quantity:
:32-sign-ext (n–n') 64bit? if d#32<<d#32>>a then;
7. "!" and "@" methods vs. "L!" and "L@" methods: Use the "!" and "@" methods to operate on variables and values automatically allocated by the system or specifically allocated by the "," method. Also use the "!" and "@" methods on field variables allocated with /N length.
8. Add, Subtract, Multiply, and Divide operations: In 64OF, these operations are acting upon 64-bit signed operands. to obtain the same result for 32OF adapter Fcode in a 64OF environment, the operands may be sign-extended, if needed, before the operations are carried out.
9. Signed Operations: The following signed operations may require sign-extending the 32-bit operand(s) to obtain the same result for both 32OF and 64OF:
   2*, 2/, /W*, /L*, /N*, CELLS, MOD, /MOD, NEGATE, ABS, WITHIN, MAX, MIN, BETWEEN, and SIGN
10. Comparison: Signed comparisons may need sign-extending 32-bit operand(s) before the test. Sign-extending will ensure that the upper 32-bit of the operand(s) on the stack is correct in 64OF. The signed comparisons are:
   0=, 0<>, 0>, 0>=, 0<, 0<=, <>, =, >=, <, and
11. Shift operations: The "<<" and ">>" methods perform in both 32OF and 64OF. The first operand of ">>a" should be sign extended using a 32-bit sign-extend method as described in suggested requirement 6 above. However, in 64OF, the left shifting 32 bits of a 32-bit value may not produce a result of 0 since the upper 32-bits of the result may be non-zero.
12. Results of logical/arithmetic operations: After performing the necessary operand(s) sign-extending, the result of these operations may need to be truncated into 32-bits, if needed, so that the result will be consistent in both 32OF and 64OF. Truncating may be performed by ANDing
0xFFFFFFFF to the result.
13. Intermediate results that are used to obtain the final result of an expression should not be truncated.
14. Care should be taken when performing arithmetic/logical operations upon addresses to avoid losing the upper 32-bits of the 64-bit address in 64OF.
15. A developer should always know which operand types are involved in an operation.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing system, comprising:
   a plurality of hardware devices, each one of the plurality of hardware devices operating in a 64-bit mode;
   a plurality of operating systems;
   a firmware component for virtualizing the plurality of hardware devices for interaction with the plurality of operating systems;
   the firmware component being implemented using 64-bits; and
   the 64-bit firmware component eliminating virtual addresses and page translations, and rendering virtual address translation from a virtual address to a 64-bit physical address unnecessary.

2. The data processing system as recited in claim 1, wherein the plurality of hardware devices comprise a plurality of processors and wherein each of the plurality of processors operates in a 64-bit mode.

3. The data processing system as recited in claim 1, wherein the firmware component comprises a firmware kernel and the firmware kernel maintains a list of address and size pairs that describe cacheable system memory addresses.

4. The data processing system as recited in claim 1, wherein a primitive method checks addresses to determine whether the address is cacheable or cache-inhibited.

5. The data processing system as recited in claim 4, wherein the primitive method, responsive to a determination that the address is cacheable, carries out the method using an appropriate machine language instruction.

6. The data processing system as recited in claim 4, wherein the plurality of hardware devices comprises a plurality of processors and wherein the primitive method, responsive to a determination that the address is cache-inhibited, enables a real mode cache-inhibited mechanism on one of the plurality of processors, allows access to the address to be performed by machine language instructions within the one of the plurality of processors, and disables the cache-inhibited mechanism; and a cache included within the one of the plurality of processors not being used when the address is cache-inhibited, and the cache being used when the address not cache-inhibited.

7. The data processing system as recited in claim 1, wherein 32-bit values are zero-extended into 64-bit values.

8. The data processing system as recited in claim 1, wherein the firmware supports both 32-bit code and 64-bit code.

9. A method of providing a virtual copy of 64-bit hardware resources within a data processing system to an operating system, the method comprising:

virtualizing the 64-bit hardware resources using a firmware component that is implemented using 64-bits, the 64-bit firmware component eliminating virtual adds and page translations, and rendering virtual address translation from a via address to a 64-bit physical address unnecessary;

receiving a request to perform an action;

responsive to a determination that values associated with the request are 64-bit quantities, performing the request; and responsive to a determination that the values associated with the request are 32-bit values, zero extending the values to 64-bit quantities and performing the request using the 64-bit quantities.

10. The method as recited in claim 9, wherein the requested action is an arithmetic operation.

11. The method as recited in claim 9, wherein the requested action is an arithmetic comparison.

12. The method as recited in claim 9, wherein the requested action is a logical operation.

13. The method as recited in claim 9, further comprising:

responsive to a determination that the requested action is a cache-inhibited action, enabling a cache-inhibited mode within a processor, performing the requested action, and disabling the cache-inhibited mode: and including a cache within the processor, the cache not being, used when the address is cache-inhibited and the cache being used when the address is not cache-inhibited.

14. The method as recited in claim 13, wherein a list of address and size pairs that describe cacheable system memory addresses are maintained and an address not falling within one of the address ranges within the list is considered to be a cache-inhibited address.

15. A computer program product in a computer readable media for use in a data processing system for providing a virtual copy of 64-bit hardware resources within a data processing System to an operating system, the computer program product comprising:

instructions for virtualizing the 64-bit hardware resources using a firmware component that is implemented using 64-bits, the 64-bit firmware component eliminating virtual addresses and page translations, and rendering virtual address translation from a virtual address to a 64-bit physical address unnecessary;

instructions for receiving a request to perform an action;

instructions, responsive to a determination that values associated with the request are 64-bit quantities, for performing the request; and instructions, responsive to a determination that the values associated with the request are 32-bit values, for zero extending the values to 64-bit quantities and performing the request using the 64-bit quantities.

16. The computer program product as recited in claim 15, wherein the requested action is an arithmetic operation.

17. The computer program product as recited in claim 15, wherein the requested action is an arithmetic comparison.

18. The computer program product as recited in claim 15, wherein the requested action is a logical operation.

19. The computer program product as recited in claim 15, further comprising:

instructions, responsive to a determination that the requested action is a cache-inhibited action, for enabling a cache-inhibited mode within a processor, performing the requested action, and disabling the cache-inhibited mode; and the processor including a cache, the cache not being used when the address is cache-inhibited and the cache being used when the address is not cache-inhibited.

20. The computer program product as recited in claim 19, wherein a list of address and size pairs that describe cacheable system memory addresses are maintained and an address not falling within one of the address ranges within the list is considered to be a cache-inhibited address.

21. A system for providing a virtual copy of 64-bit hardware resources within a data processing system to an operating system, the system comprising:

a firmware component for virtualizing the 64-bit hardware resources, the firmware component being implemented using 64-bits, the 64-bit firmware component eliminating virtual addresses and page translations, and rendering virtual address translation from a virtual address to a 64-bit physical address unnecessary;

first means for receiving a request to perform an action;

second means, responsive to a determination that values associated with the request are 64-bit quantities, for performing the request; and third means, responsive to a determination that the values associated with the request are 32-bit values, for zero extending the values to 64-bit quantities and performing the request using the 64-bit quantities.

22. The system as recited in claim 21, wherein the requested action is an arithmetic operation.

23. The system as recited in claim 21, wherein the requested action is an arithmetic comparison.

24. The system as recited in claim 21, wherein the requested action is a logical operation.

25. The system as recited in claim 21, further comprising:

means, responsive to a determination that the requested action is a cache-inhibited action, for enabling a cache-inhibited mode within a processor, performing the requested action, and disabling the cache-inhibited mode; and the processor including a cache, the cache not being used when the address is cache-inhibited and the cache being used when the address is not cache-inhibited.

26. The system as recited in claim 25, wherein a list of address and size pairs that describe cacheable system memory addresses are maintained and an address not falling within one of the address ranges within the list is considered to be a cache-inhibited address.

* * * * *

UNITED STATES PATENT AND TRADEMARK OFFICE
CERTIFICATE OF CORRECTION

PATENT NO. : 6,802,063 B1
DATED : October 5, 2004
INVENTOR(S) : Lee

It is certified that error appears in the above-identified patent and that said Letters Patent is hereby corrected as shown below:

Column 9,
Line 3, after "virtual" delete "adds" and insert -- addresses --.
Line 5, after "from a" delete "via" and insert -- virtual --.
Line 27, after "being" delete ",".
Line 38, after "processing" delete "System" and insert -- system --.

Signed and Sealed this

Twentieth Day of December, 2005

JON W. DUDAS
*Director of the United States Patent and Trademark Office*